US010635358B2

(12) United States Patent
Hsiao et al.

(10) Patent No.: US 10,635,358 B2
(45) Date of Patent: Apr. 28, 2020

(54) MEMORY MANAGEMENT METHOD AND STORAGE CONTROLLER

(71) Applicant: Shenzhen EpoStar Electronics Limited CO., Shenzhen (CN)

(72) Inventors: Yu-Hua Hsiao, Hsinchu County (TW); Hung-Chih Hsieh, Hsinchu County (TW)

(73) Assignee: Shenzhen EpoStar Electronics Limited CO., Shenzhen (CN)

( * ) Notice: Subject to any disclaimer, the term of this patent is extended or adjusted under 35 U.S.C. 154(b) by 0 days.

(21) Appl. No.: 16/218,437

(22) Filed: Dec. 12, 2018

(65) Prior Publication Data

US 2020/0081655 A1 Mar. 12, 2020

(30) Foreign Application Priority Data

Sep. 7, 2018 (TW) .............................. 107131605 A

(51) Int. Cl.
*G06F 3/06* (2006.01)
*G06F 12/02* (2006.01)
*G06F 13/16* (2006.01)
*G06F 11/30* (2006.01)

(52) U.S. Cl.
CPC ............ *G06F 3/0659* (2013.01); *G06F 3/061* (2013.01); *G06F 3/0679* (2013.01); *G06F 11/3037* (2013.01); *G06F 12/0246* (2013.01); *G06F 13/1673* (2013.01); *G06F 2201/88* (2013.01)

(58) Field of Classification Search
CPC ...... G06F 3/0659; G06F 3/061; G06F 3/0679; G06F 11/3037; G06F 2201/88
See application file for complete search history.

(56) References Cited

U.S. PATENT DOCUMENTS

| 2007/0168626 | A1* | 7/2007 | De Souza | G06F 12/0804 711/159 |
| 2012/0278541 | A1* | 11/2012 | Yamaki | G06F 12/0246 711/103 |
| 2018/0060232 | A1* | 3/2018 | Oshinsky | G06F 12/0804 |
| 2018/0275921 | A1* | 9/2018 | Katagiri | G06F 3/0659 |
| 2018/0322051 | A1* | 11/2018 | Heller | G06F 12/0804 |
| 2019/0004715 | A1* | 1/2019 | Trika | G06F 3/065 |
| 2019/0332436 | A1* | 10/2019 | Lee | G06F 3/0679 |

* cited by examiner

Primary Examiner — Edward J Dudek, Jr.
(74) Attorney, Agent, or Firm — JCIPRNET

(57) ABSTRACT

A memory management method is provided. The method includes storing an acquired first command into a command queue, wherein in response to determining that the first command is a flush command, a flush phase value of the flush command and a corresponding second command is set according to a current flush phase, a command phase count value corresponding to the current flush phase is calculated, and the current flush phase is adjusted; selecting a new target command from the command queue, and executing the target command according to a target flush phase value of the target command and a corresponding target flush phase count value, wherein the target flush phase count value not being a preset value is adjusted; determining, according to the adjusted target flush phase count value, whether to respond to a host system that an execution of a target flush command corresponding to the target flush phase value is completed.

12 Claims, 13 Drawing Sheets

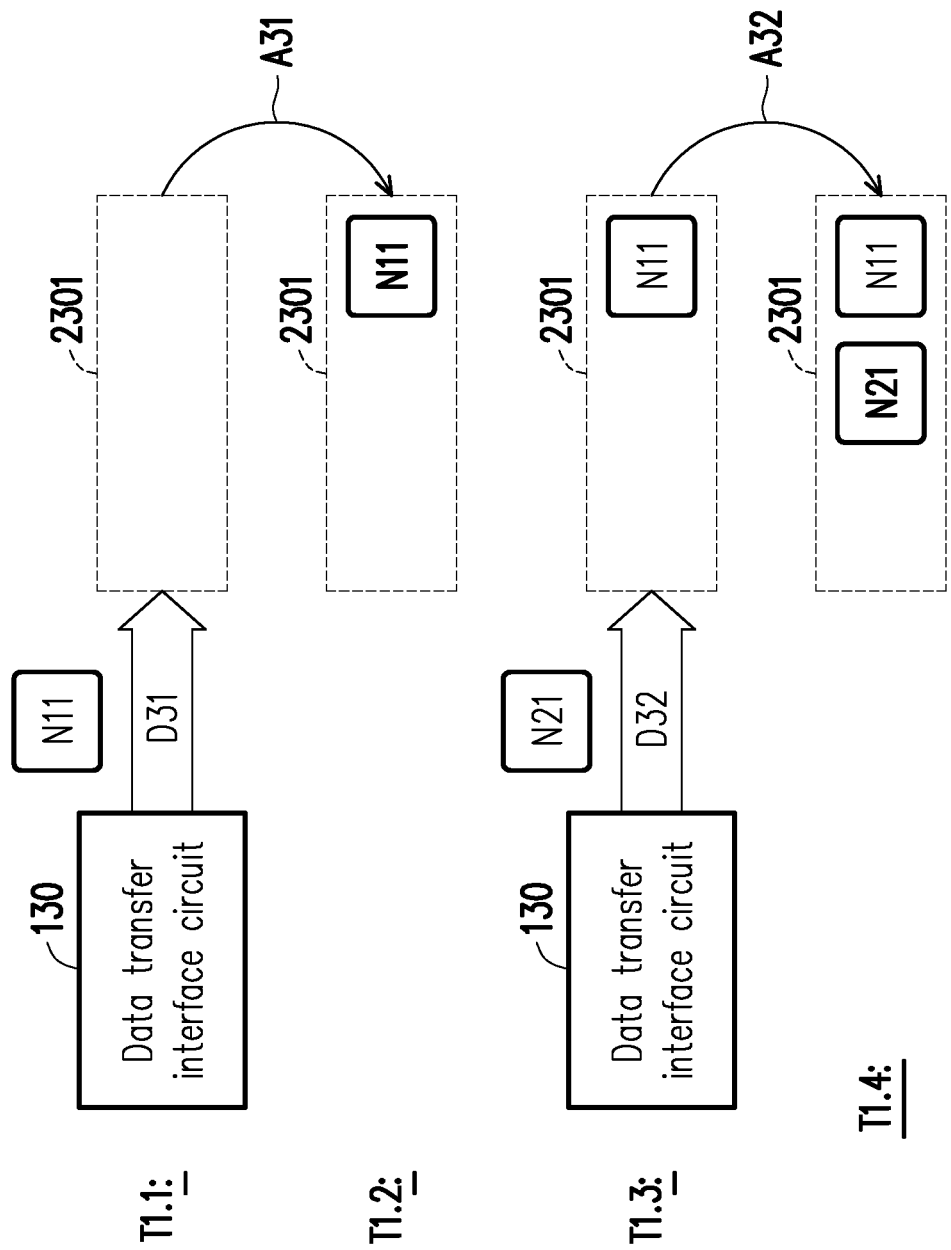

MEMORY MANAGEMENT METHOD AND STORAGE CONTROLLER

CROSS-REFERENCE TO RELATED APPLICATION

This application claims the priority benefit of Taiwan application serial no. 107131605, filed on Sep. 7, 2018. The entirety of the above-mentioned patent application is hereby incorporated by reference herein and made a part of this specification.

BACKGROUND

Technology Field

The invention relates to a memory management method, and more particularly, to a memory management method and a storage controller adapted to a storage device having a rewritable non-volatile memory module.

Description of Related Art

A solid state drive (a storage device disposed with a rewritable non-volatile memory module) having traditional SATA (Serial Advanced Technology Attachment) interface uses Advanced Host Controller Interface (hereinafter, referred to as AHCI) standard for allowing software to communicate with the SATA storage device. In general, AHCI has 32 command depth for allowing a host system to send 32 commands at the same time.

However, with the development of hardware, the solid state drive with SATA interface also evolves into a solid state drive with PCIe (Peripheral Component Interconnect Express) interface, and the solid state drive of PCIe interface uses a non-volatile memory host controller interface (Non-Volatile Memory express, hereinafter referred to as NVMe) standard. In general, NVMe has 65536 command depth for allowing the host system to send 65536 commands at the same time. In other words, because NVMe standard can provide nearly two thousand times the command depth, the number of commands from the host system that a storage controller needs to manage is also significantly increased.

Therefore, how to manage a large number of commands received under NVMe standard and improve efficiency of the solid state drive with PCIe interface for processing the commands is one of the research subjects in the field.

SUMMARY

The invention provides a memory management method (a.k.a. a host command management method) and a storage controller, which are capable of efficiently digesting multiple commands in a command queue and reducing a resource fight caused by a flush command.

An embodiment of the invention provides a memory management unit method adapted to a storage device having a rewritable non-volatile memory module. The method includes the following steps: (1) acquiring a new first command from a command buffer, and determining whether the first command is a flush command, wherein step (2a) is executed in response to determining that the first command is the flush command, wherein step (2b) is executed in response to determining that the first command is not the flush command; (2a) storing the flush command into a command queue, identifying one or more second commands corresponding to the flush command in the command queue according to the flush command, and counting a sum (total amount) of the flush command and said one or more second commands as a flush phase count corresponding to a current flush phase; setting a flush phase value of each of the flush command and said one or more second commands in the command queue according to the current flush phase, and adjusting the current flush phase from a first flush phase among a plurality of flush phases to a second flush phase; and executing step (1) or step (3) according to a total of one or more flush commands in the command queue and a remaining space of the command queue; (2b) storing the first command into the command queue, and executing step (1) or step (3) according to the remaining space of the command queue; (3) stop acquiring a new first command from the command buffer, and executing step (4); (4) selecting a new target command from one or more non-flush commands in the command queue, and identifying a target flush phase value of the target command and a target flush phase count corresponding to the target flush phase value, wherein step (5a) is executed in response to the target command not having the target flush phase value, wherein step (5b) is executed in response to the target command having the target flush phase value; (5a) executing the target command, deleting the target command from the command queue in response to an execution of the target command being completed, and executing step (1); (5b) changing the target flush phase count, and executing step (5a) or step (5c) according to the changed target flush phase count; (5c) executing the target command, responding to a host system that an execution of a target flush command corresponding to the target flush phase count is completed, setting the target flush phase count as the preset value, and executing step (1).

An embodiment of the invention provides a storage controller, which is configured to control a storage device having a rewritable non-volatile memory module. The storage controller includes a connection interface circuit, a memory interface control circuit, a host command management circuit unit and a processor. The connection interface circuit is configured to couple to a host system. The memory interface control circuit is configured to couple to the rewritable non-volatile memory module. The processor is coupled to the connection interface circuit, the memory interface control circuit and the host command management circuit unit. The processor is configured to instruct the host command management circuit unit to execute a host command management operation. The host command management operation includes the following steps: (1) acquiring a new first command from a command buffer and determine whether the first command is a flush command by the host command management circuit unit, wherein step (2a) is executed in response to determining that the first command is the flush command, wherein step (2b) is executed in response to determining that the first command is not the flush command; (2a) storing the flush command into the command queue, identifying one or more second commands corresponding to the flush command in the command queue according to the flush command and counting a sum (total amount) of the flush command and said one or more second commands as a flush phase count corresponding to a current flush phase by the host command management circuit unit; setting a flush phase value of each of the flush command and said one or more second commands in the command queue according to the current flush phase and adjusting the current flush phase from a first flush phase among a plurality of flush phases to a second flush phase by the host command management circuit unit; and executing step (1) or step (3) according to a total of one or more flush commands in the command queue and a remaining space of the command queue by the host command management circuit unit; (2b) storing the first command into the command queue and executing step (1) or step (3) according to the remaining space of the command queue by the host command management circuit unit; (3) stop acquiring a new first command from the command buffer and executing step (4) by the host command management circuit unit; (4) selecting a new target command from one or more non-flush commands in the command queue and identifying a target flush phase value of the target command and a target flush phase count corresponding to the target flush phase value by the host command management circuit unit, wherein step (5a) is executed in response to the target command not having the target flush phase value, wherein step (5b) is executed in response to the target command having the target flush phase value; (5a) instructing the processor to execute the target command by the host command management circuit unit, and deleting the target command from the command queue in response to an execution of the target command being completed and executing step (1) by the host command management circuit unit; (5b) changing the target flush phase count and executing step (5a) or step (5c) according to the changed target flush phase count by the host command management circuit unit; (5c) instructing the processor to execute the target command and respond to the host system that an execution of a target flush command corresponding to the target flush phase count is completed by the host command management circuit unit, and setting the target flush phase count as the preset value and executing step (1) by the host command management circuit unit.

Based on the above, when the flush command is received by the command queue, instead of executing and clearing the non-flush commands corresponding to the flush command in the command queue directly according to the received flush command, the memory management method and the memory controller provided by this embodiment of the invention can record the corresponding flush phase values to the flush command and the commands corresponding to the flush command in the command queue according to the current flush phase, record the corresponding flush phase counts and update the current flush phase. In addition, the recorded flush phase count may be further adjusted according to different conditions to manage commands corresponding to different flush phases in the command queue, thereby completing the received flush command. In other words, the memory management method and the storage controller provided by this embodiment can prevent the non-flush commands corresponding to the flush command in the command queue from having special priority (prevent the resource fight caused by the flush command), so as to avoid delaying the execution of the other commands. In this way, the storage device can complete the received flush command while smoothly digesting (executing) all the commands in the command queue, thereby improving data access efficiency and work efficiency of the storage device. Moreover, the use of the flush phase count can allow the storage controller to manage the commands corresponding to the different flush phases currently in the command queue more efficiently.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3A and FIG. 3B are schematic diagrams illustrating how a command buffer receives commands from a host system according to an embodiment of the invention.

DESCRIPTION OF THE EMBODIMENTS

Figure 1:
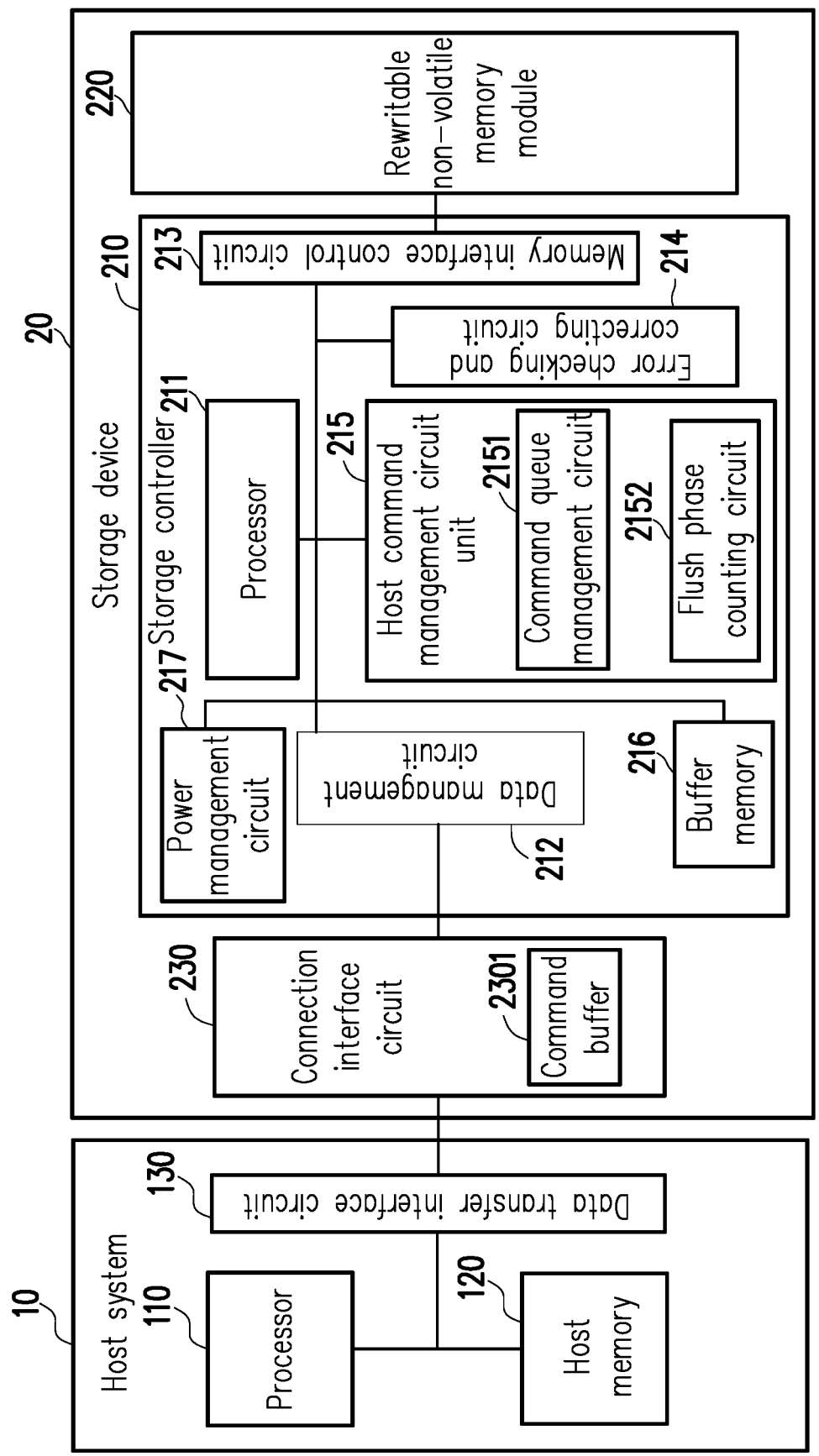
FIG. 1 is a block diagram illustrating a host system and a storage device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In the present embodiment, a storage device includes a rewritable non-volatile memory module and a storage device controller (a.k.a. a storage controller or a storage control circuit). Also, the storage device is usually used together with a host system so the host system can write data into or read data from the storage device.

FIG. 1 is a block diagram illustrating a host system and a storage device according to an embodiment of the invention.

Referring to FIG. 1, a host system 10 includes a processor 110, a host memory 120 and a data transfer interface circuit 130. In the present embodiment, the data transfer interface circuit 130 is coupled to (or, electrically connected to) the processor 110 and the host memory 120. In another embodiment, the processor 110, the host memory 120 and the data transfer interface circuit 130 are coupled to one another by utilizing a system bus.

A storage device 20 includes a storage controller 210, a rewritable non-volatile memory module 220 and a connection interface circuit 230. Among them, the storage controller 210 includes a processor 211, a data management circuit 212 and a memory interface control circuit 213.

In this embodiment, the host system 10 is coupled to the storage device 20 through the data transfer interface circuit 130 and the connection interface circuit 230 of the storage device 20 to perform a data accessing operation. For example, the host system 10 can store data to the storage device 20 or read data from the storage device 20 through the data transfer interface circuit 130.

In the present embodiment, the processor 110, the host memory 120 and the data transfer interface circuit 130 may be disposed on a main board of the host system 10. The number of the data transfer interface circuit 130 may be one or more. Through the data transfer interface circuit 130, the main board may be coupled to the storage device 20 in a wired manner or a wireless manner. The storage device 20 may be, for example, a flash drive, a memory card, a solid state drive (SSD) or a wireless memory storage device. The wireless memory storage device may be, for example, a memory storage device based on various wireless communication technologies, such as a NFC (Near Field Communication) memory storage device, a WiFi (Wireless Fidelity) memory storage device, a Bluetooth memory storage device, a BLE (Bluetooth low energy) memory storage device (e.g., iBeacon). Further, the main board may also be coupled to various I/O devices including a GPS (Global Positioning System) module, a network interface card, a wireless transmission device, a keyboard, a monitor and a speaker through the system bus.

In this embodiment, the data transfer interface circuit 130 and the connection interface circuit 230 are an interface circuit compatible with a Peripheral Component Interconnect Express (PCI Express) interface standard. Further, a data transfer is performed between the data transfer interface circuit 130 and the connection interface circuit 230 by using a communication protocol of a Non-Volatile Memory express (NVMe) interface standard.

Nevertheless, it should be understood that the invention is not limited in this regard. The data transfer interface circuit 130 and the connection interface circuit 230 may also be compatible to a PATA (Parallel Advanced Technology Attachment) standard, an IEEE (Institute of Electrical and Electronic Engineers) 1394 standard, a USB (Universal Serial Bus) standard, a SD interface standard, a UHS-I (Ultra High Speed-I) interface standard, a UHS-II (Ultra High Speed-II) interface standard, a MS (Memory Stick) interface standard, a Multi-Chip Package interface standard, a MMC (Multi Media Card) interface standard, an eMMC interface standard, a UFS (Universal Flash Storage) interface standard, an eMCP interface standard, a CF interface standard, an IDE (Integrated Device Electronics) interface standard or other suitable standards. Further, in another embodiment, the connection interface circuit 230 and the storage controller 210 may be packaged into one chip, or the connection interface circuit 230 is distributed outside a chip containing the storage controller 210.

In this embodiment, the host memory 120 is configured to temporarily store commands executed by the processor 110 or data. For instance, in this exemplary embodiment, the host memory 120 may be a DRAM (Dynamic Random Access Memory), or a SRAM (Static Random Access Memory) and the like. Nevertheless, it should be understood that the invention is not limited in this regard, and the host memory 120 may also be other appropriate memories.

The storage unit 210 is configured to execute a plurality of logic gates or control commands, which are implemented in a hardware form or in a firmware form, and to perform operations of writing, reading or erasing data in the rewritable non-volatile memory storage module 220 according to the commands of the host system 10.

More specifically, the processor 211 in the storage controller 210 is a hardware with computing capabilities, which is configured to control overall operation of the storage controller 210. Specifically, the processor 211 has a plurality of control commands and the control commands are executed to perform various operations such as writing, reading and erasing data during operation of the storage device 20.

It is noted that, in the present embodiment, the processor 110 and the processor 211 are, for example, a central processing unit (CPU), a micro-processor, other programmable microprocessors, a digital signal processor (DSP), a programmable controller, an application specific integrated circuits (ASIC), a programmable logic device (PLD) or other similar circuit elements, which are not particularly limited by the invention.

In an embodiment, the storage controller 210 further includes a ROM (not illustrated) and a RAM (not illustrated). More particularly, the ROM has a boot code, which is executed by the processor 221 to load the control commands stored in the rewritable non-volatile memory module 220 into the RAM of the storage controller 210 when the storage controller 210 is enabled. Then, the control commands are executed by the processor 211 to perform operations, such as writing, reading or erasing data. In another embodiment, the control commands of the processor 211 may also be stored as program codes in a specific area (for example, physical storage units in the rewritable non-volatile memory module 220 dedicated for storing system data) of the rewritable non-volatile memory module 220.

In this embodiment, as described above, the storage controller 210 further includes the data management circuit 212 and the memory interface control circuit 213. It should be noted that, operations performed by each part of the storage controller 210 may also be considered as operations performed by the storage controller 210.

The data management circuit 212 is coupled to the processor 211, the memory interface control circuit 213 and the connection interface circuit 230. The data management circuit 212 is configured to transmit data under instruction of the processor 211. For example, the data may be read from the host system 10 (e.g., the host memory 120) through the connection interface circuit 230, and the read data may be written into the rewritable non-volatile memory module 220 through the memory interface control circuit 213 (e.g., a writing operation performed according to a write command from the host system 10). As another example, the data may be read from one or more physical units of the rewritable non-volatile memory module 220 through the memory interface control circuit 213 (the data may be read from one or more memory cells in one or more physical units), and the read data may be written into the host system 10 (e.g., the host memory 120) through the connection interface circuit 230 (e.g., a reading operation performed according to a read command from the host system 10). In another embodiment, the data management circuit 212 may also be integrated into the processor 211.

The memory interface control circuit 213 is configured to receive instruction of the processor 211 (or a host command management circuit unit 215), and perform the writing (a.k.a. programming) operation, the reading operation and an erasing operation for the rewritable non-volatile memory module 220 in conjunction with the data management circuit 212. For example, the reading operation for a storage unit of the rewritable non-volatile memory module 220 is performed by using a specific read voltage based on instruction of the host command management circuit unit 215.

For instance, the processor 211 may execute a write command sequence to instruct the memory interface control circuit 213 to write the data into the rewritable non-volatile memory module 220; the processor 211 can execute a read command sequence to instruct the memory interface control circuit 213 to read the data from one or more physical units corresponding to the read command in the rewritable non-volatile memory module 220; the processor 211 can execute an erase command sequence to instruct the memory interface control circuit 213 to perform the erasing operation for the rewritable non-volatile memory module 220. Each of the write command sequence, the read command sequence and the erase command sequence may include one or more program codes or command codes, which are configured to perform the corresponding writing, reading and erasing operations on the rewritable non-volatile memory module 220. In an embodiment, the processor 211 can further send other command sequences to the memory interface control circuit 213 so as to perform the corresponding operations for the rewritable non-volatile memory module 220.

In addition, data to be written to the rewritable non-volatile memory module 220 is converted into a format acceptable by the rewritable non-volatile memory module 220 through the memory interface control circuit 213. Specifically, when the processor 211 intends to execute the write or read commands for accessing the rewritable non-volatile memory module 220, the processor 211 sends the corresponding command sequences to the memory interface control circuit 213 in order to instruct the memory interface control circuit 213 to perform the corresponding operations. For example, the command sequences may include the write command sequence as an instruction for writing data, the read command sequence as an instruction for reading data, the erase command sequence as an instruction for erasing data, and other corresponding command sequences as instructions for performing various memory operations (e.g., a wear leveling operation or a garbage collection operation). The command sequences may include one or more signals, or data transmitted in the bus. The signals or the data may include command codes and program codes. For example, information such as identification codes and memory addresses are included in the read command sequence.

The rewritable non-volatile memory module 220 is coupled to the storage controller 210 (the memory control circuit unit 213) and configured to store data written from the host system 10. The rewritable non-volatile memory module 220 may be a SLC (Single Level Cell) NAND flash memory module (i.e., a flash memory module capable of storing one bit in one memory cell), an MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), a QLC (Quadruple Level Cell) NAND flash memory module (i.e., a flash memory module capable of storing four bits in one memory cell), a 3D NAND flash memory module or a vertical NAND flash memory module, a vertical NAND flash memory module or a vertical NAND flash memory module other flash memory modules or any memory module having the same features. The memory cells in the rewritable non-volatile memory module 220 are disposed in an array.

In this embodiment, the rewritable non-volatile memory module 220 has a plurality of word lines, wherein each word line among the word lines includes a plurality of memory cells. The memory cells on the same word line constitute one or more physical programming units (physical pages). In addition, a plurality of physical programming units may constitute one physical unit (a physical block or a physical erasing unit). In this embodiment, one physical programming unit may include the physical pages of different types.

For instance, in an embodiment, for the TLC NAND flash memory module, one physical programming unit of the TLC NAND flash memory module may include a first type physical page and a second type physical page. The first type physical page is, for example, a lower physical page storing one bit value; and the second type physical page includes, for example, a middle physical page and an upper physical page each stores one bit value. As another example, in an embodiment, for the TLC NAND flash memory module, one physical programming unit of the TLC NAND flash memory module may include a first type physical page, a second type physical page and a third type physical page. The first type physical page is, for example, a lower physical page storing one bit value; the second type physical page is, for example, a middle physical page storing one bit value; and the third type physical page is, for example, an upper physical page storing one bit value. In general, when data is to be written into the upper, middle and lower physical pages of the TLC NAND flash memory module, the data is written into the lower physical page, the middle physical page, and the upper physical page in that sequence.

In this embodiment, the physical erasing unit is a minimum unit for erasing (i.e., each erasing physical unit includes a minimum number of memory cells to be erased together). Each of the physical erasing units has a plurality of physical programming units. One physical erasing unit may refer to a combination of any number of the physical programming units, depending on practical requirements.

In the following embodiments, for example, one physical block is used as one physical erasing unit (a.k.a. the physical unit), and each physical programming unit is regarded as one physical sub-unit. Further, it should be understood that, when the processor 211 groups the physical programming units (or the physical units) in the rewritable non-volatile memory module 220 for the corresponding management operations, the physical programming units (or the physical units) are logically grouped and their actual locations are not changed.

The storage controller 210 assigns a plurality of logical units for the rewritable non-volatile memory module 220. The host system 10 accesses user data stored in a plurality of physical units through the assigned logical units. Here, each of the logical units may be composed of one or more logical addresses. For example, the logical unit may be a logical block, a logical page, or a logical sector. In this embodiment, the logical unit is a logical block, and the logical sub-unit is a logical page. Each logical unit includes a plurality of logical sub-units. One logical unit may be mapped to one physical unit, and one logical sub-unit may be mapped to one physical sub-unit.

For instance, the storage controller 210 creates a logical to physical address mapping table and a physical to logical address mapping table for recording a mapping relation between the logical addresses (e.g., the logical blocks, the logical pages or the logical sectors) assigned to the rewritable non-volatile memory module 220 and the physical addresses (e.g., the physical erasing units, the physical programming units or the physical sectors). In other words, the storage controller 210 can find the physical address mapped to one logical address by using the logical to physical address mapping table, and the storage controller 210 can find the logical address mapped to one physical address by using the physical to logical address mapping table. Nonetheless, the technical concept for mapping relations among the logical addresses and the physical addresses is a well-known technical means in the field, which is not repeated hereinafter.

In this embodiment, the error checking and correcting circuit 214 is coupled to the processor 211 and configured to execute an error checking and correcting procedure to ensure correctness of data. Specifically, when the processor 211 receives the write command from the host system 10, the error checking and correcting circuit 214 generates an ECC (error correcting code) and/or an EDC (error detecting code) for data corresponding to the write command, and the processor 211 writes data corresponding to the write command and the corresponding ECC and/or the EDC into the rewritable non-volatile memory module 220. Then, when the processor 211 reads the data from the rewritable non-volatile memory module 220, the ECC and/or the EDC corresponding to the data are also read, and the error checking and correcting circuit 214 performs the error checking and correcting procedure on the read data based on the ECC and/or the EDC. In addition, after the error checking and correcting procedure is completed, if the read data is successfully decoded, the error checking and correcting circuit 214 can return an error bit value (a.k.a. the number of error bits) to the processor 211.

In an embodiment, the storage controller 210 further includes a buffer memory 216 and a power management circuit 217. The buffer memory is coupled to the processor 211 and configured to temporarily store data and commands from the host system 10, data from the rewritable non-volatile memory module 220 or other system data for managing the storage device 20 so the processor 211 can rapidly access the data, the command or the system data from the buffer memory 216. The power management circuit 217 is coupled to the processor 211 and configured to control power of the storage device 20.

It should be noted that, in this embodiment, the connection interface circuit 230 includes a command buffer 2301, which is configured to temporarily store commands (a.k.a. host commands) from the host system 10. The temporarily stored host commands are then transmitted to a command queue managed by the host command management circuit unit 215 for further management. The command buffer 2301 is, for example, a static random-access memory or other similar memories/storage circuits.

In this embodiment, the host command management circuit unit 215 includes a command queue management circuit 2151 and a flush phase counting circuit 2152. The processor 211 instructs the host command management circuit unit 215 to execute a host command management operation. Operations performed by each part of the host command management circuit unit 215 may also be considered as operations performed by the host command management circuit unit 215. The host command management circuit unit 215 (or the command queue management circuit 2151) is configured to manage the command queue, and the command queue is configured to store the host commands received from the command buffer 2301 according to a command receiving order. In addition, the host command management circuit unit 215 (or the flush phase counting circuit 2152) is also configured to record and manage information regarding the host commands in the command queue (e.g., a flush phase and a flush phase count corresponding to the received host command, or a flush phase count table).

Details regarding how the host command management circuit unit 215 performs the host command management operation as well as functions of the command queue management circuit 2151 and the flush phase counting circuit 2152 are described below with reference to the accompanied drawings.

Figure 2A:
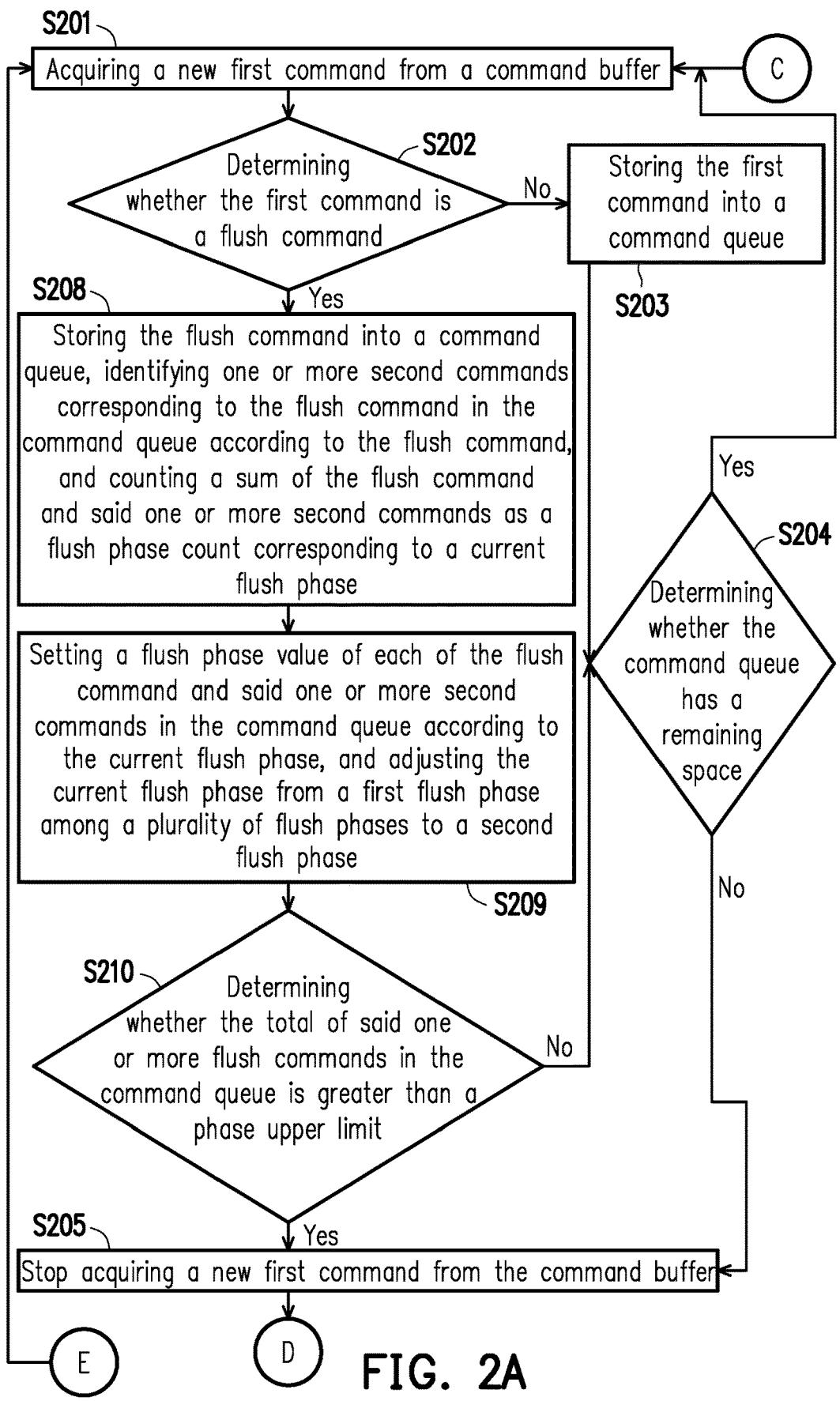
FIGS. 2A to 2C are flowcharts illustrating a memory management method according to an embodiment of the invention.
Figure 2B:
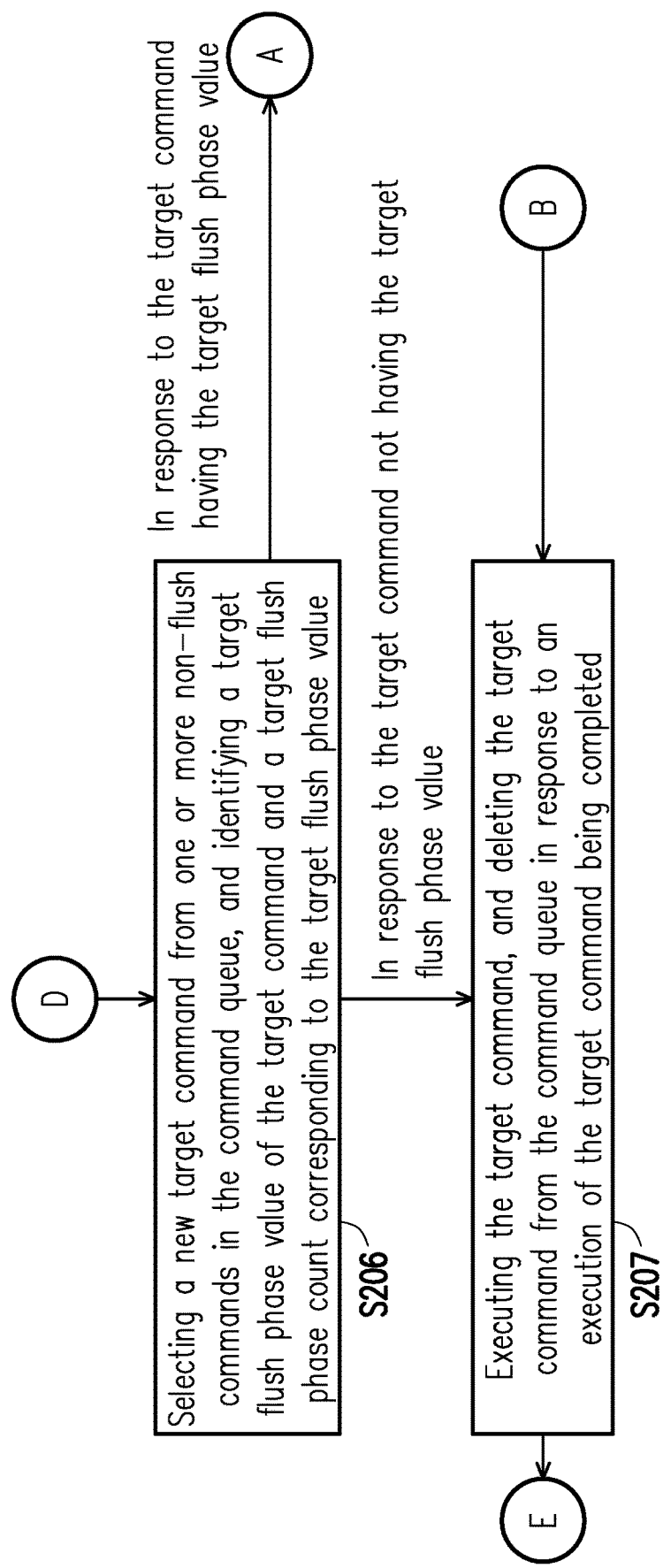
Figure 2C:
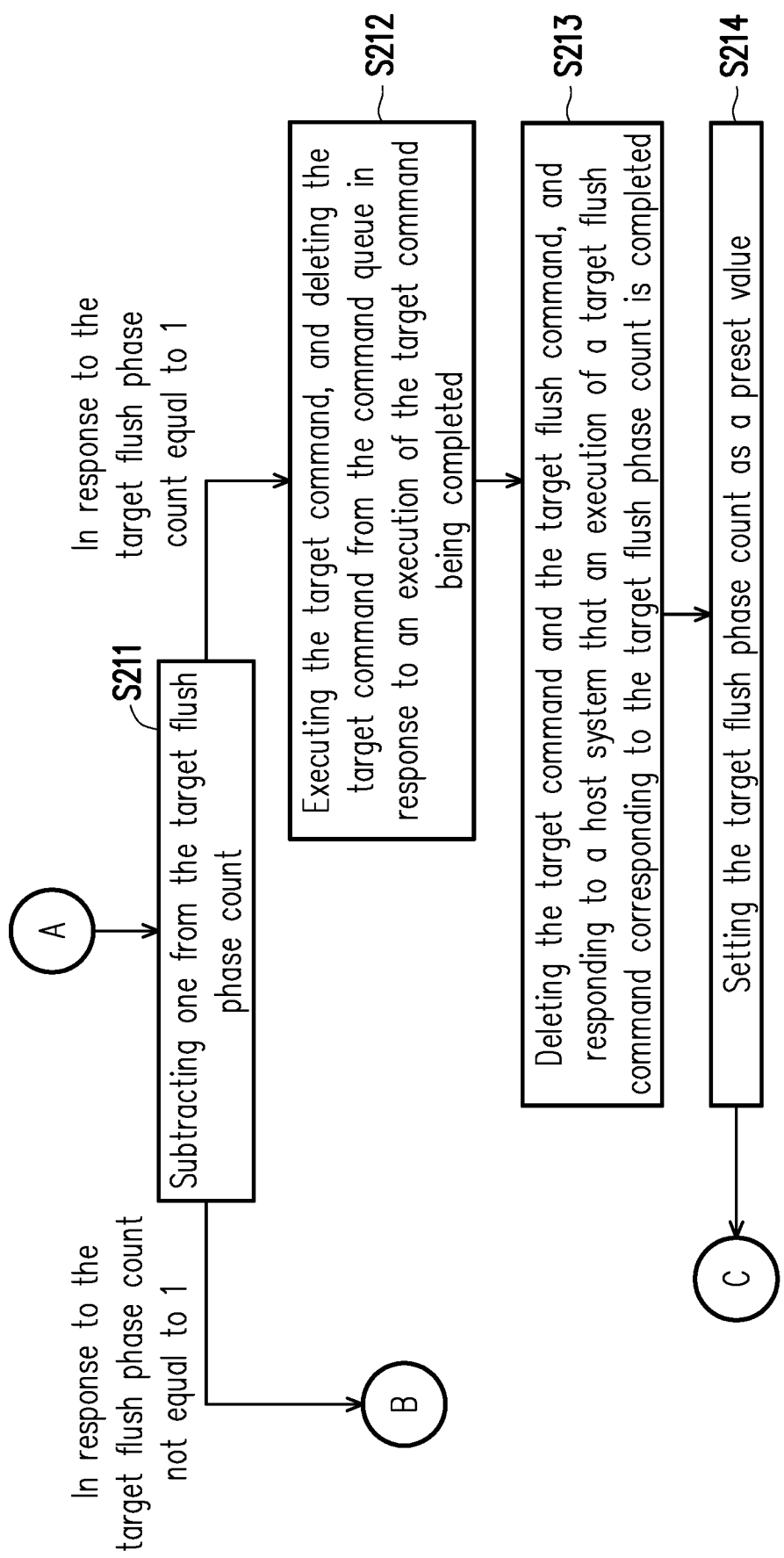

FIGS. 2A to 2C are flowcharts illustrating a memory management method according to an embodiment of the invention. It should be noted that, the memory management method illustrated in FIGS. 2A to 2C may also be referred to as the host command management method. Further, nodes A, B, C, D and E are merely used to connect steps in the process for clarity of description and are not used to limit the invention. Referring to FIG. 1, and FIGS. 2A to 2C together, in step S201, the command queue management circuit 2151 acquires a new first command from the command buffer 2301. The acquired first command is stored into the command queue of the command queue management circuit 2151.

Specifically, the processor 110 of the host system 10 can send the commands (a.k.a. the host commands) to the storage device via the data transfer interface circuit. The host commands are temporarily stored in the command buffer 2301. The host commands may be classified into a flush command and a command that does not belong to the flush command (a.k.a. a non-flush command). The flush command corresponding to one identification unit (or corresponding to a thread or corresponding to a namespace) is configured to delete multiple non-flush commands corresponding to the identification unit from the command queue. The invention is not limited by the identification unit corresponding to the flush command. For example, in another embodiment, the identification unit includes but not limited to: (1) Client; (2) Terminal; (3) Entity.

The non-flush commands include but not limited to: (1) commands for accessing data, such as the read command, the write command, etc.; (2) control commands for controlling the storage device, such as a trim command, a power-on command, a power-off command, a sleep command, etc.

First of all, the process of receiving commands from the host system by the command buffer is described below utilizing FIG. 3A and FIG. 3B.

Figure 3B:
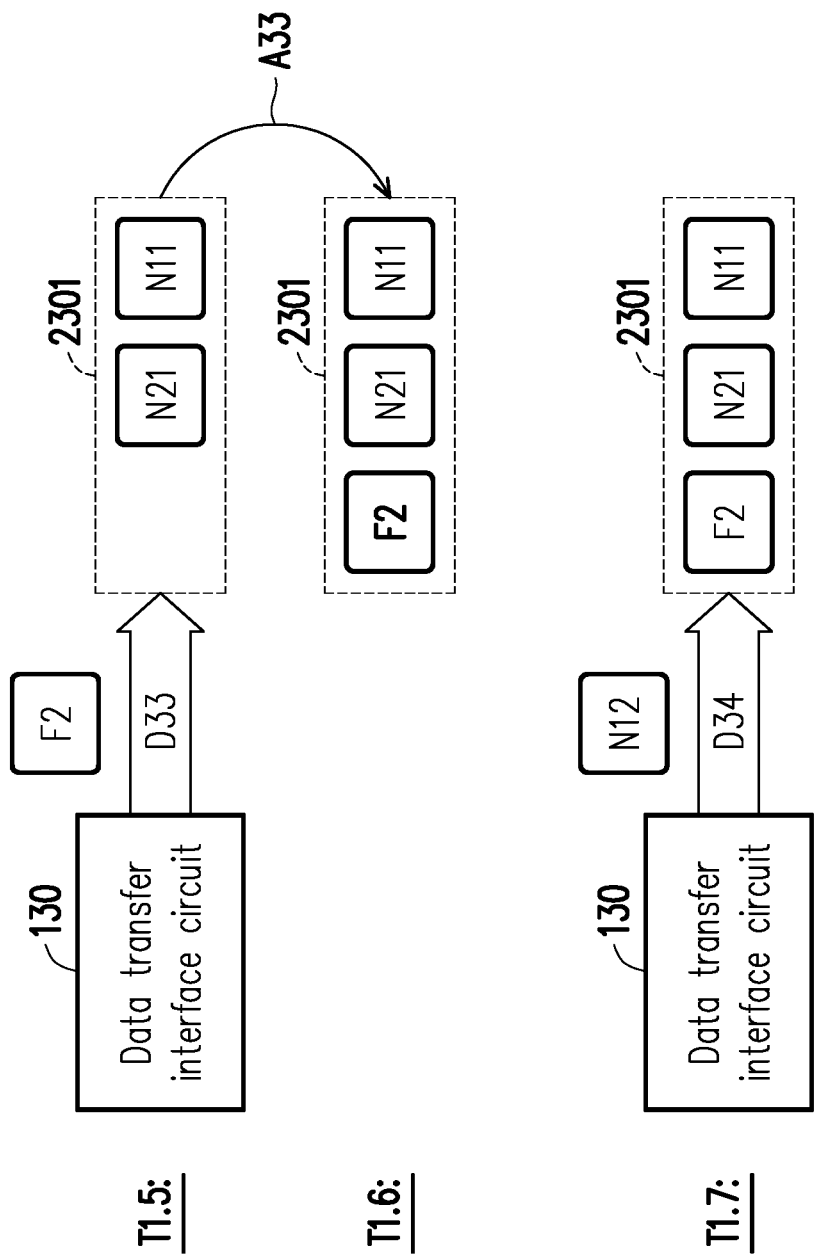

FIG. 3A and FIG. 3B are schematic diagrams illustrating how a command buffer receives commands from a host system according to an embodiment of the invention. With reference to FIG. 3A, for descriptive convenience, it is assumed that the command buffer 2301 includes spaces for storing only three commands. At a timepoint T1.1, the processor 110 of the host system 10 sends a command N11 to the command buffer 2301 via the data transfer interface circuit 130 (e.g., as shown by an arrow D31). "N" in the command "N11" is used to indicate that this command is the non-flush command; the first "1" in "11" is used to indicate that this command is corresponding to an identification unit "1" and the second "1" in "11" is used to indicate that this command is corresponding to the "1st" command corresponding to the identification unit "1". An identification code of the identification unit "1" is, for example, "ID1".

Next, at a timepoint T1.2, the command buffer 2301 stores the received command N11 by a first in first out (FIFO) approach (e.g., as shown by an arrow A31). In other words, the commands stored in the command buffer 2301 are arranged in chronological order, and the command being stored first is read (acquired) first.

Next, at a timepoint T1.3, the processor 110 of the host system 10 sends a command N21 to the command buffer 2301 via the data transfer interface circuit 130 (e.g., as shown by an arrow D32). At a timepoint T1.4, the command buffer 2301 stores the received command N21 by the FIFO approach (e.g., as shown by an arrow A32). The command N21 is arranged after the command N11.

With reference to FIG. 3B, next, at a timepoint T1.5, the processor 110 of the host system 10 sends a command F2 to the command buffer 2301 via the data transfer interface circuit 130 (e.g., as shown by an arrow D33). "F" in the command "F1" is used to indicate that this command is the flush command; whereas "2" is used to indicate that this command is corresponding to an identification unit "2". An identification code of the identification unit "2" is, for example, "ID2".

At a timepoint T1.6, the command buffer 2301 stores the received command F2 by the FIFO approach (e.g., as shown by an arrow A33). The command F2 is arranged after the command N21. Both the commands N21 and F2 are corresponding to the same identification unit "2". The flush command F2 is configured to delete all specific commands corresponding to the same identification unit "2" prior to the flush command F2 (e.g., the flush command F2 is configured to delete the command N21). Further, it should be noted that, in this embodiment, said specific commands corresponding to the flush command F2 belong to the write command. For instance, it is assumed that the host system successively transmits the read command, the write command and the flush command (all these three commands correspond to the same identification unit) to the command buffer 2301. In this example, the flush command is used only to delete the write command (without deleting the read command). For descriptive convenience, all the non-flush commands described in the following embodiments are the write commands.

Next, at a timepoint T1.7, the processor 110 of the host system 10 sends a command N12 to the command buffer 2301 via the data transfer interface circuit 130 (e.g., as shown by an arrow D34). Since the command buffer 2301 is out of spaces (full), the command N12 can no longer be stored in the command buffer 2301. At this time, the processor 211 can instruct the host command management circuit unit 215 to execute the host command management operation to digest the commands received from the host system and stored by the command buffer 2301 so the command buffer 2301 can clear the space for receiving the command N12.

Figure 4A:
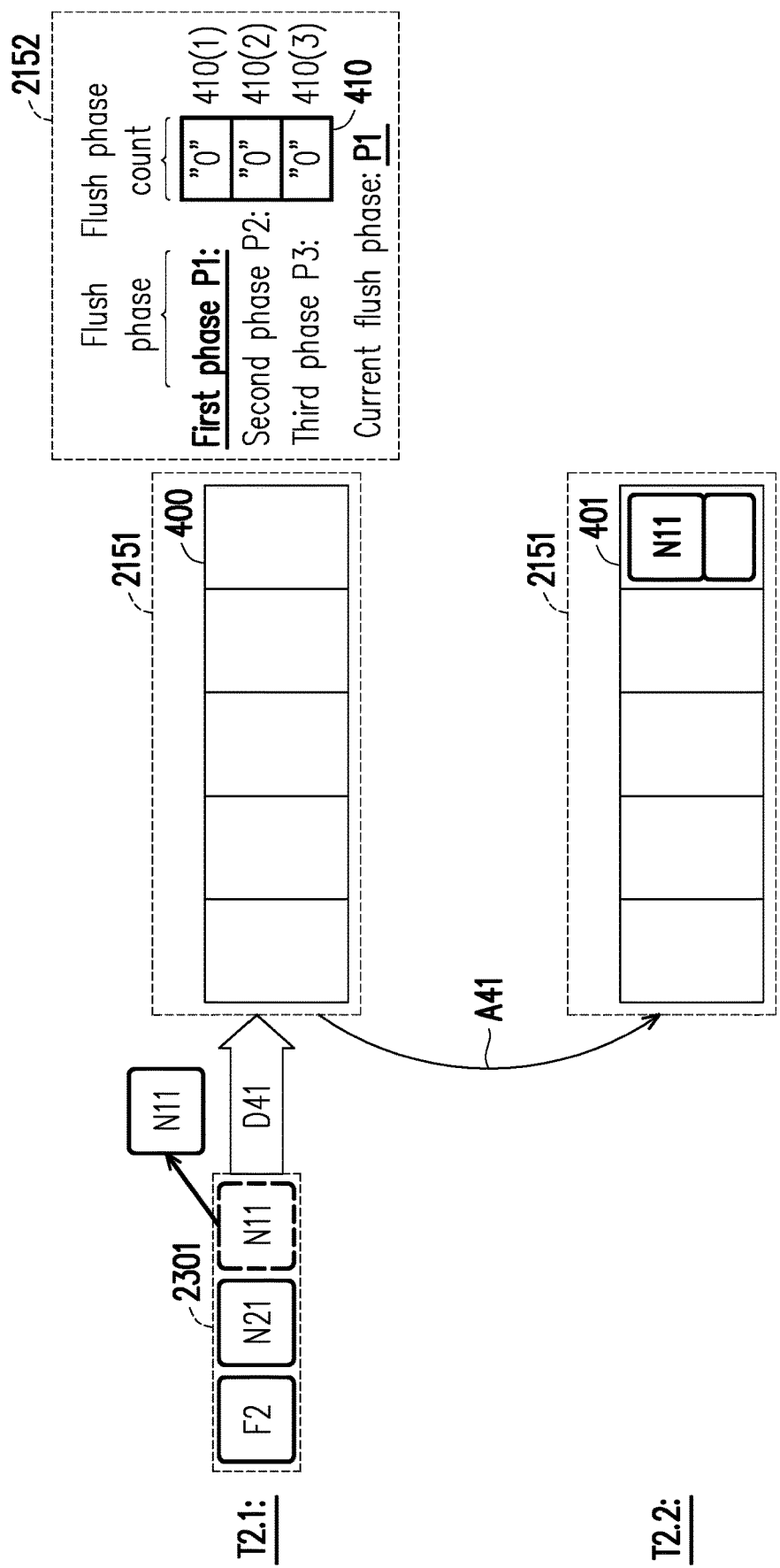
FIG. 4A to FIG. 4D are schematic diagrams for managing a command queue according to an embodiment of the invention.
Figure 4B:
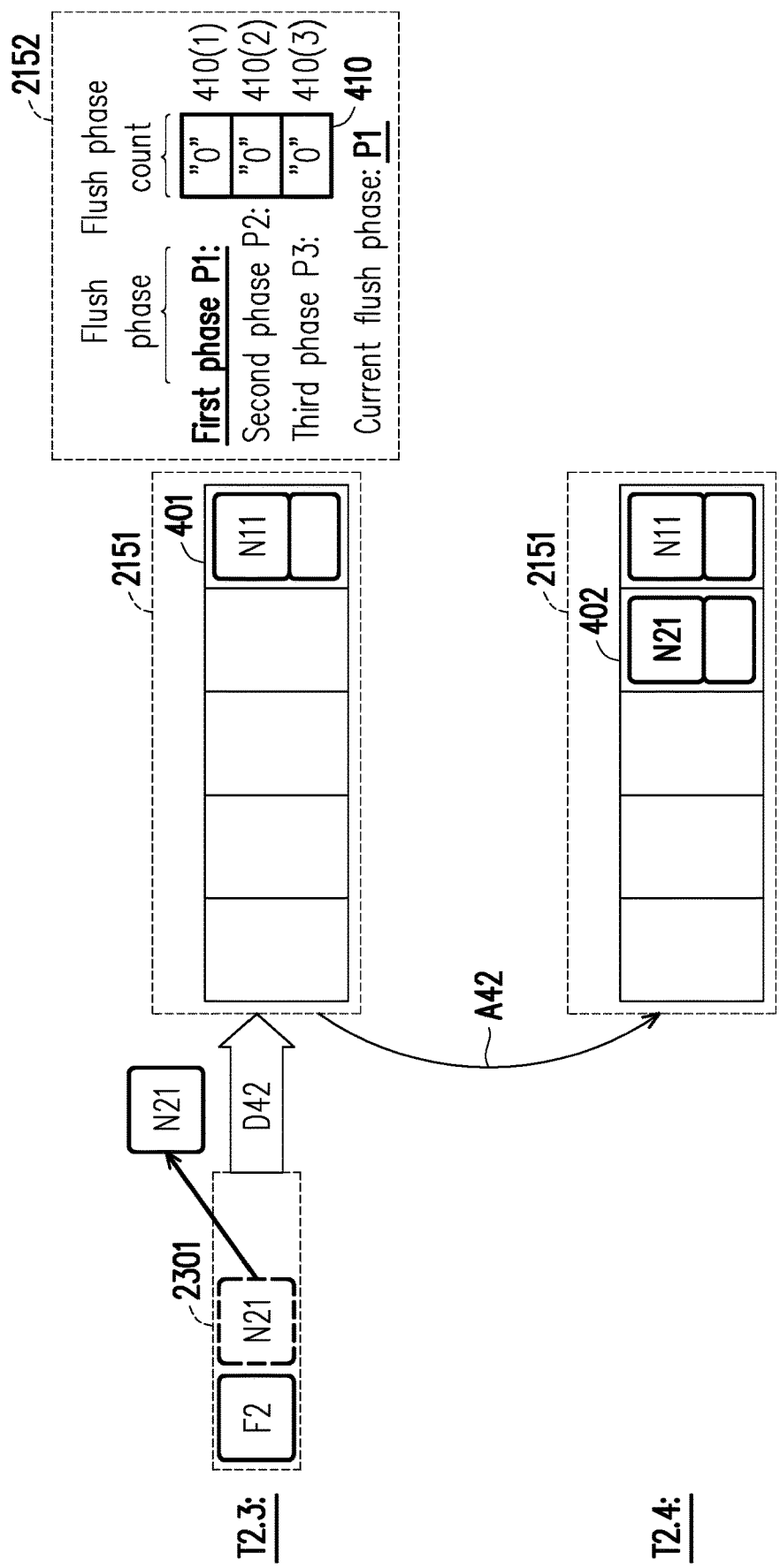

FIG. 4A to FIG. 4D are schematic diagrams for managing a command queue according to an embodiment of the invention. With reference to FIG. 4A, at a timepoint T2.1, as shown by an arrow D41, in continuation to the above example, the host command management circuit unit 215 acquires a new command (a.k.a. the first command) N11 from the command buffer 2301. That is to say, the command N11 is transmitted to (read by) the command queue management circuit 2151 of the host command management circuit unit 215, and the command queue management circuit 2151 stores the command N11 into a command queue 400. In addition, the flush phase counting circuit 2152 records a plurality of flush phase counts 410(1) to 410(3) respectively corresponding to a plurality of flush phases P1 to P3 (e.g., first phase P1, second phase, and third phase P3). In this embodiment, the flush phase counts 410(1) to 410(3) are initialized to a preset value (e.g., "0"). In another embodiment, the preset value may be initialized to "−1", a null value (i.e., NULL) or other suitable values.

In this embodiment, the flush phase counting circuit 2152 can utilize a flush phase count table 410 to record the flush phase counts 410(1) to 410(3) respectively corresponding to the flush phases P1 to P3. The flush phases P1 to P3 are arranged in a round robin manner. That is to say, the flush phase P2 is arranged after the flush phase P1; the flush phase P3 is arranged after the flush phase P2; and the flush phase P1 is arranged after the flush phase P3. In addition, the flush phase counting circuit 2152 further records a current flush phase, which is configured to indicate that the current flush phase is one of the flush phases P1 to P3. In this embodiment, in response to a specific event (e.g., the first command received from the command buffer 2301 is the flush command), the flush phase counting circuit 2152 switches (adjusts) the current flush phase from one flush phase (a.k.a. a first flush phase) to a new flush phase (a.k.a. a second flush phase) arranged after the first flush phase according to the flush phases P1 to P3 arranged in the round robin manner. For example, the current flush phase may be adjusted from the flush phase P1 to the flush phase P2; the current flush phase may be adjusted from the flush phase P2 to the flush phase P3; and the current flush phase may be adjusted from the flush phase P3 to the flush phase P1. The current flush phase may be initialized to the flush phase P1, for example. The recorded current flush phase may be integrated into the flush phase count table (e.g., utilizing a specific field to mark the current flush phase as one of the flush phases P1 to P3). The current flush phase among the flush phases P1 to P3 is switched (adjusted) according to the flush commands received in sequence.

Referring back to FIG. 2A, next, in step S202, the command queue management circuit 2151 determines whether the first command is the flush command. Whether to execute steps S203 (S202→No) or S208 (S202→Yes) is determined according to the acquired first command. In step S203, the command queue management circuit 2151 stores the first command into the command queue.

For instance, with reference to FIG. 4A, the command queue management circuit 2151 determines that the command N11 is not the flush command, and stores the command N11 into a command queue 401 (at a timepoint T2.2), as shown by an arrow A41. It should be noted that, at the time, a flush phase value of the command N11 has not been set yet (which is blank).

Next, in step S204, the command queue management circuit 2151 determines whether the command queue has a remaining space. Here, step S201 is executed in response to determining that the command queue has the remaining space; and step S205 is executed in response to determining that the command queue does not have the remaining space.

For instance, as shown in FIG. 4A, the command queue 400 has five remaining spaces; and the command queue 401 has four remaining spaces (one of the remaining spaces has been used for storing the command N11). After storing the command N11 into the command queue 401, the command queue management circuit 2151 determines that the command queue 401 has the remaining space, and executes step S201 to continue acquiring another command (the new first command) from the command buffer 2301. For instance, with reference to FIG. 4B, at a timepoint T2.3, as shown by an arrow D42, the command N21 is acquired from the command buffer 2301. At a timepoint T2.4, as shown by an arrow A42, the command queue management circuit 2151 determines that the command N21 is not the flush command, stores the command N21 into command queue 402, and arranges the command N21 after the command N11.

Figure 4C:
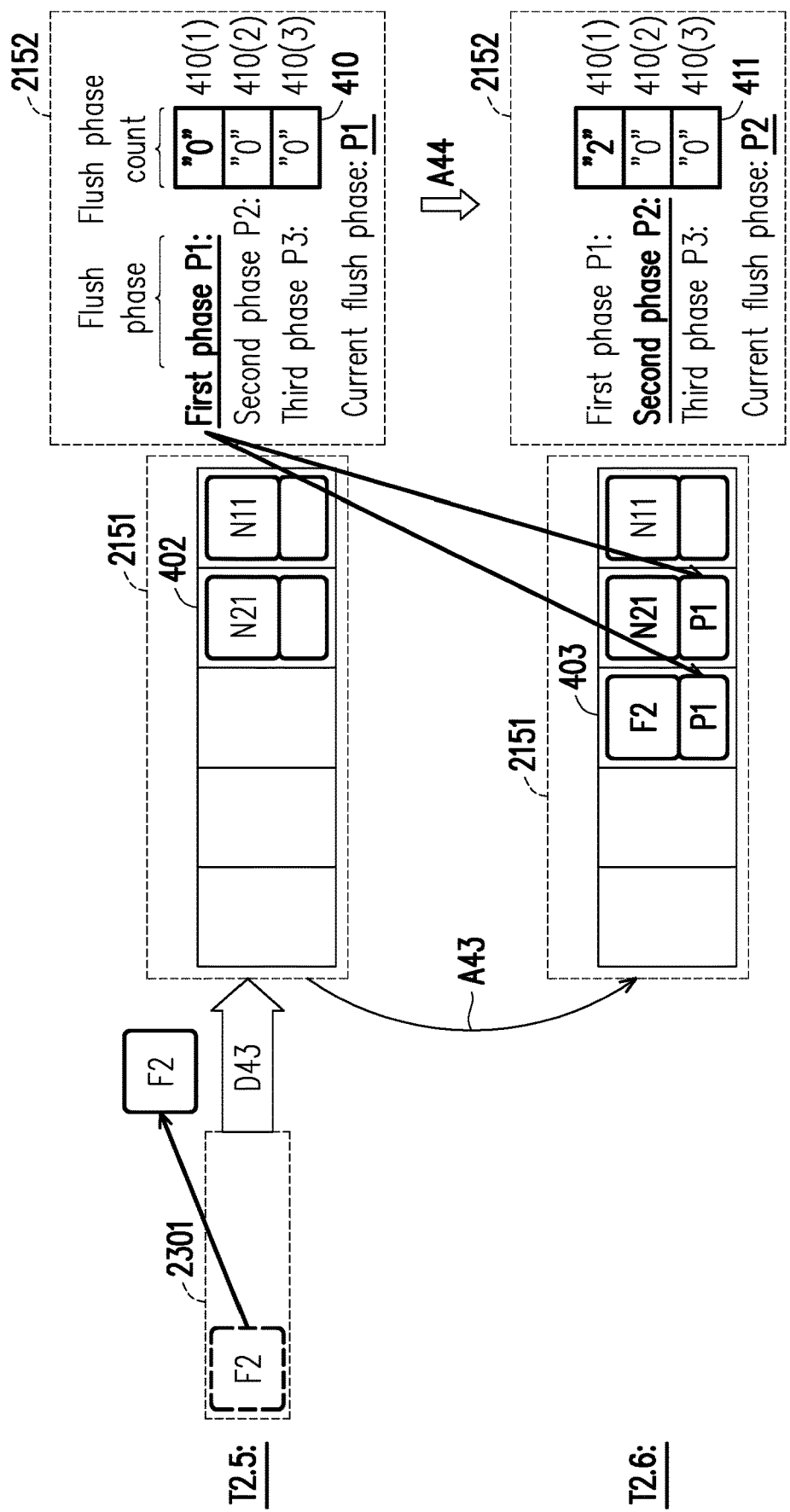

Next, since the command queue management circuit 2151 determines that the command queue 402 has the remaining space, the command queue management circuit 2151 executes step S201 to continue acquiring another command (the new first command) from the command buffer 2301. As illustrated in FIG. 4C, at a timepoint T2.5, as shown by an arrow D43, the new command F2 is acquired. Then, the command queue management circuit 2151 determines that the command F2 is the flush command and proceeds to execute step S208.

In step S208, the command queue management circuit 2151 stores the flush command into the command queue, identifies one or more second commands corresponding to the flush command in the command queue according to the flush command, and counts a sum of the flush command and said one or more second commands as a flush phase count corresponding to a current flush phase.

Specifically, at a timepoint T2.6, as shown by an arrow A43, the flush command F2 is stored into a command queue 403. Further, in response to determining that the first command F2 is the flush command, the command queue management circuit 2151 identifies said one or more second commands corresponding to the flush command F2 in the command queue 403 according to the flush command F2. Specifically, the command queue management circuit 2151 can identify that the flush command F2 corresponds to the identification unit "2" and identify that the flush command F2 is used to delete one or more write commands corresponding to the identification unit "2" in the command queue 403. Accordingly, the command queue management circuit 2151 determines that the command N21 is the second command corresponding to the flush command F2 (because the command N21 is the write command corresponding to the identification unit "2"). Next, the flush phase counting circuit 2152 further counts a sum (total amount) of the flush command F2 and the second command N21 currently in the command queue as the flush phase count corresponding to the current flush phase (i.e., the first flush phase P1). In other words, after receiving the flush command, the command queue management circuit 2151 determines that the flush command and the corresponding second command belong to the same flush phase. Thus, the flush phase counting circuit 2152 calculates the sum of the flush command and the corresponding second command, and records the sum as the flush phase count corresponding to said flush phase.

Next, in step S209, the command queue management circuit 2151 sets a flush phase value of each of the flush command and said one or more second commands in the command queue according to the current flush phase, and the flush phase counting circuit 2152 adjusts the current flush phase from a first flush phase among a plurality of flush phases to a second flush phase.

For example, with reference to FIG. 4C, the command queue management circuit 2151 sets the flush phase values of the flush command F2 and the corresponding second command N21 in the command queue 403 according to the current flush phase "P1". That is to say, the flush phase values of the flush command F2 and the corresponding second command N21 in the command queue 403 are both marked as "P1". It should be noted that, since the command N11 is not corresponding to the flush command F2 (the command N11 is not corresponding to the identification unit "2"), the command queue management circuit 215 does not set the flush phase value of the command N11 (i.e., the flush phase value of the command N11 remains blank).

Next, the flush phase counting circuit 2152 adjusts the current flush phase from the first flush phase P1 among a plurality of flush phases to the second flush phase P2 (as shown by an arrow A44). In addition, the flush phase counting circuit 2152 further changes the flush phase count 410(1) corresponding to the first phase P1 (the current flush phase is "P1") from the preset value to "2" (e.g., according to the among of the commands corresponding to the first phase P1 in the command queue). In other words, the flush phase count table is updated from the flush phase count table 410 to a flush phase count table 411. It should be noted that, the preset value may also be set to other non-zero values.

The invention is not limited by the method of setting the flush phase value through the current flush phase described above. For example, in another embodiment, according to the common identification unit of the flush command and said one or more second commands corresponding to the flush command, the command queue management circuit 2151 uses an identification code of that common identification unit as the flush phase value, so as to set the flush phase values (which are the same identification code) of the flush command and said one or more second commands corresponding to the flush command in the command queue. For instance, if both the commands F2 and N21 correspond to the identification unit "2", the command queue management circuit 2151 can directly set the flush phase values of the commands F2 and N21 as "ID2". In addition, the flush phase counting circuit 2152 may also record the flush phase value corresponding to the flush phase "ID2" as "2" (because the sum of the commands F2 and N21 is two). In other words, the original "P1" may be replaced by the identification code "ID2" of the identification units of the commands F2 and N21.

Referring back to FIG. 2A, next, in step S210, the command queue management circuit 2151 determines whether a total of one or more flush commands in the command queue is greater than a phase upper limit. Here, in response to determining that the total of said one or more flush commands is greater than phase upper limit, the command queue management circuit 2151 executes step S205; and in response to determining that the total of said one or more flush commands is not greater than phase upper limit, the command queue management circuit 2151 executes step S204.

Specifically, in this embodiment, a value of the phase upper limit is a total of the flush phases P1 to P3 minus 1 (i.e., 3−1=2). In other words, the phase upper limit is used to limit the total of the flush phase values marked in the command queue to be a total of all the recordable flush phase values (3) at the most. That is to say, if the flush phase counts of all the flush phases have been used (the total of the used flush phase values is 3), the command queue management circuit 2151 executes step S205 at this time to stop acquiring the new first command.

For example, as shown by the example in the lower portion of FIG. 4C, the command queue management circuit 2151 determines that only the command F2 is the flush command in the command queue 403. That is to say, the total of all the flush commands in the command queue 403 (i.e., 1) is not greater than the phase upper limit. Next, the overall process proceeds to step S204 to continue determining whether the command queue has the remaining space for storing the new command.

Figure 4D:
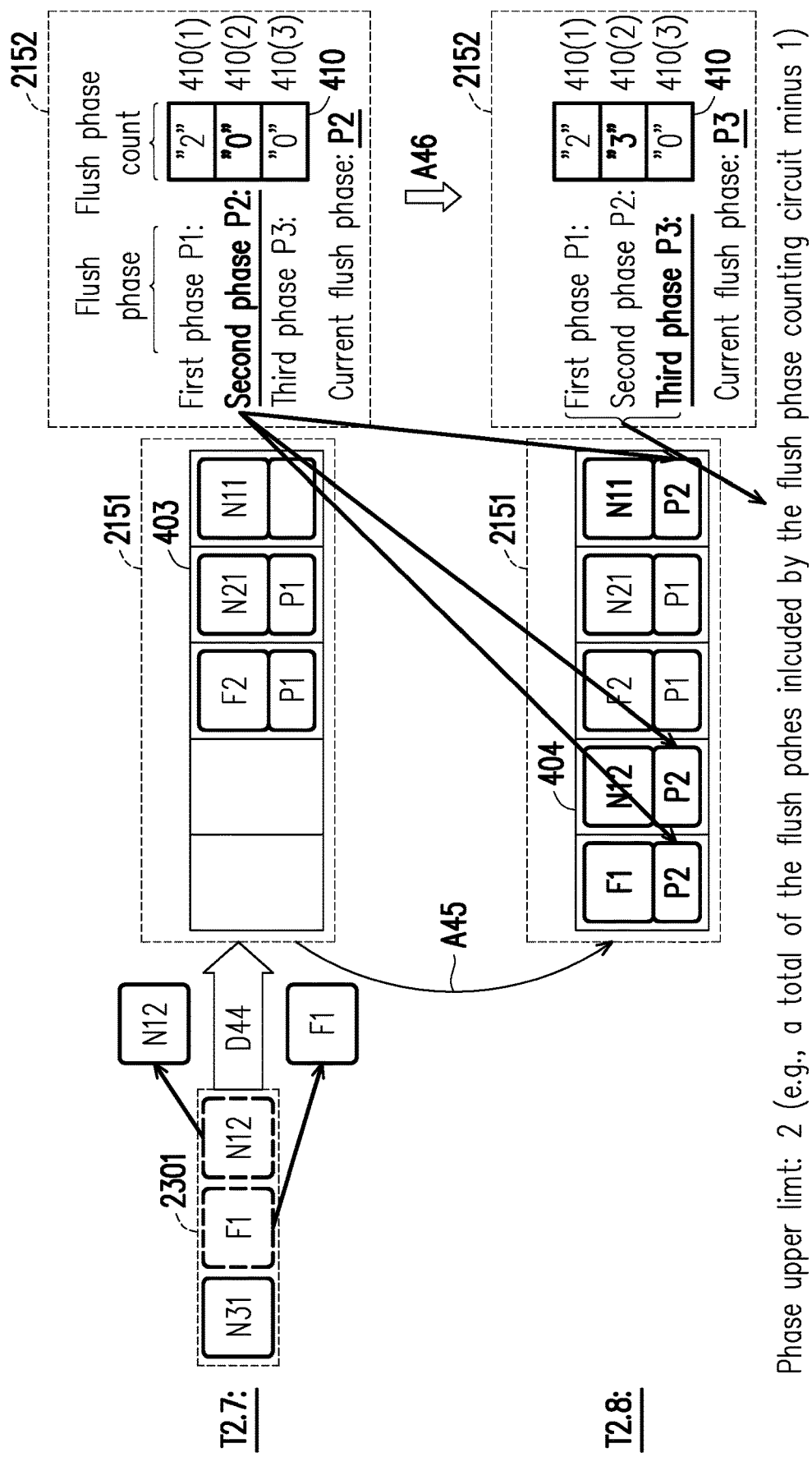

At this time, in step S204, the command queue management circuit 2151 determines that the command queue 403 has two remaining spaces and proceeds to execute step S201. With reference to FIG. 4D, it is assumed that the command buffer 2301 receives three commands N12, F1 and N31 from the host system 10. Starting from a timepoint T2.7, as described in the process above, the command N12 and the command F1 are acquired one after another (as shown by an arrow D44), and then the commands N12 and F1 are stored into a command queue 404 (as shown by an arrow A45).

In addition, since the command F1 is the flush command, the command queue management circuit 2151 identifies the commands N11 and N12 corresponding to the flush command F1. Further, the command queue management circuit 2151 sets the flush phase value of the flush command F1 in the command queue 404 as "P2" according to the current flush phase "P2", and sets the flush phase values of the second commands N11 and N12 corresponding to the flush command as "P2". The flush phase counting circuit 2152 records the flush phase count 410(2) corresponding to the flush phase "P2" as "3" (which is no longer the preset value) according to the sum of the flush command F1 and the corresponding second commands N11 and N12, and adjusts the current flush phase to "P3" (as shown by an arrow A46).

Next, the process proceeds to step S210. At this time, in step S210, the command queue management circuit 2151 determines that the total of said one or more flush commands in the command queue is not greater than the phase upper limit. Next, the overall process proceeds to step S204. However, as this time, the command queue management circuit 2151 determines that the command queue 404 does not have the remaining space and executes step S205. In step S205, the command queue management circuit 2151 stops acquiring a new first command from the command buffer 2301. In other words, while the step S205 is executed, the command queue management circuit 2151 is configured to stop acquiring any new first command from the command buffer 2301. Next, referring to FIG. 2B, in step S206, the command queue management circuit 2151 selects a new target command from one or more non-flush commands in the command queue, and identifies a target flush phase value of the target command and a target flush phase count corresponding to the target flush phase value. Here, in response to the target command having the target flush phase value, step S211 is executed; and in response to the target command not having the target flush phase value, step S207 is executed. The following content is described with reference to FIG. 5A to FIG. 5C.

Figure 5A:
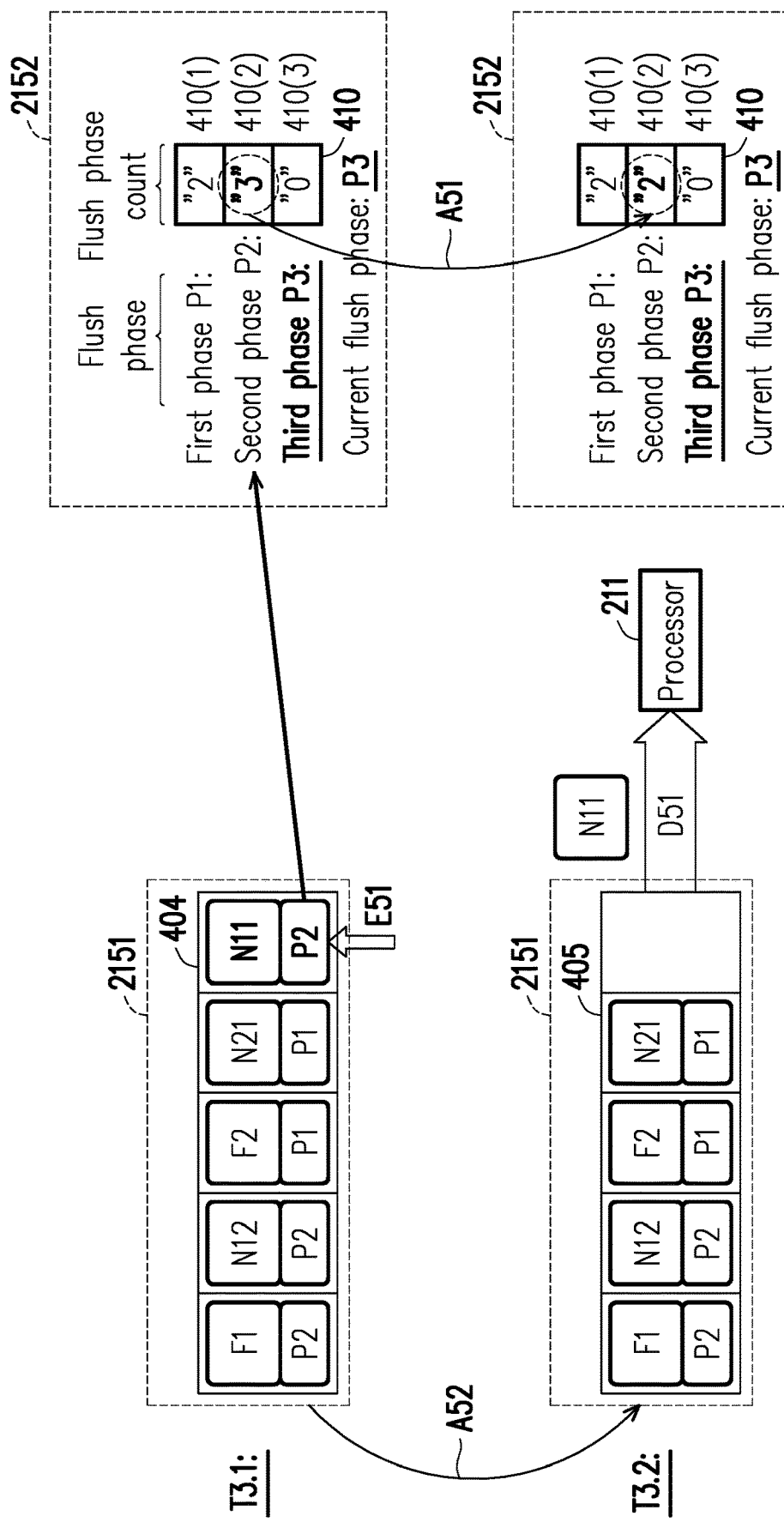
FIG. 5A to FIG. 5C are schematic diagrams for managing a command queue according to another embodiment of the invention.
Figure 5B:
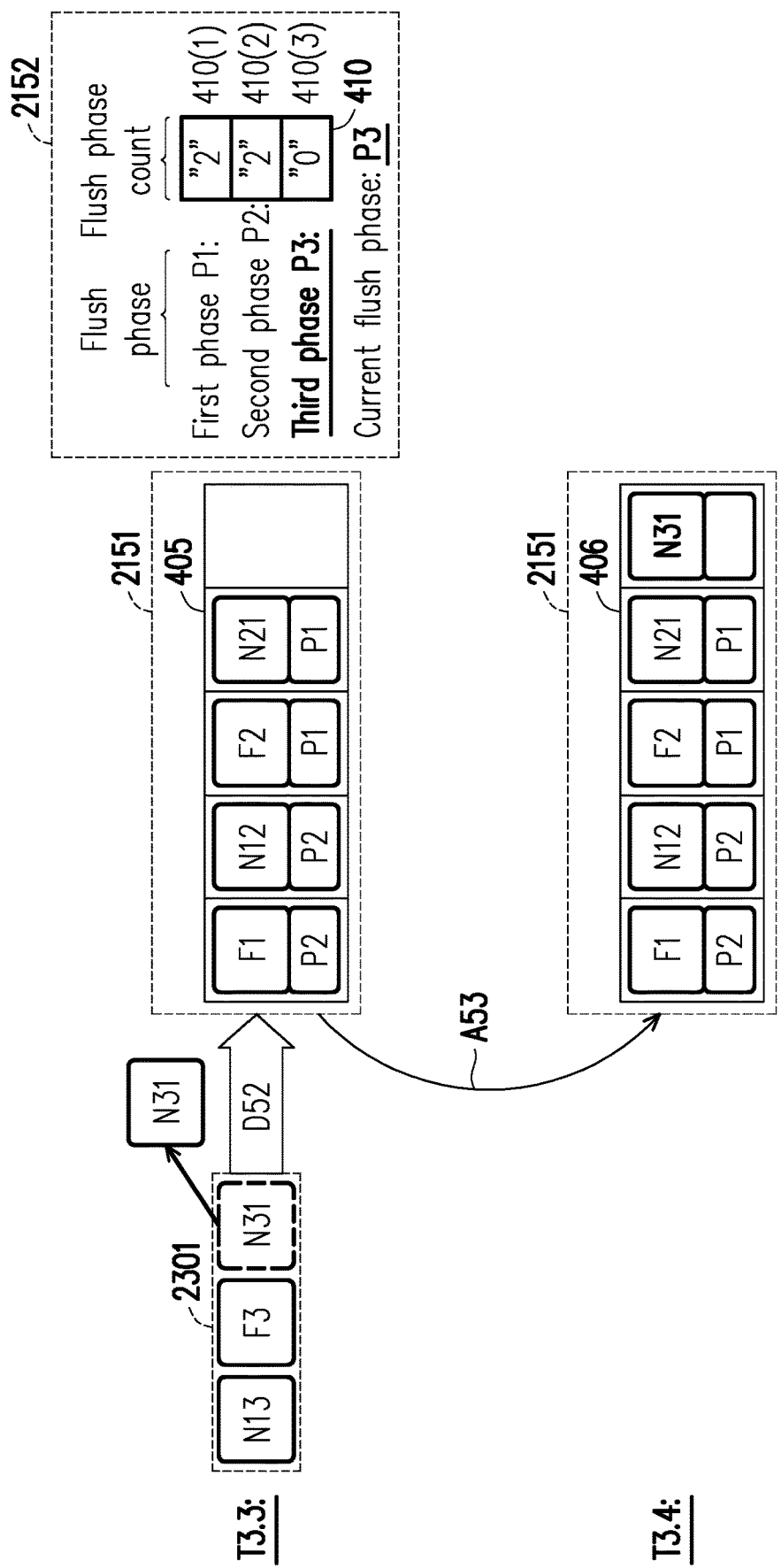
Figure 5C:
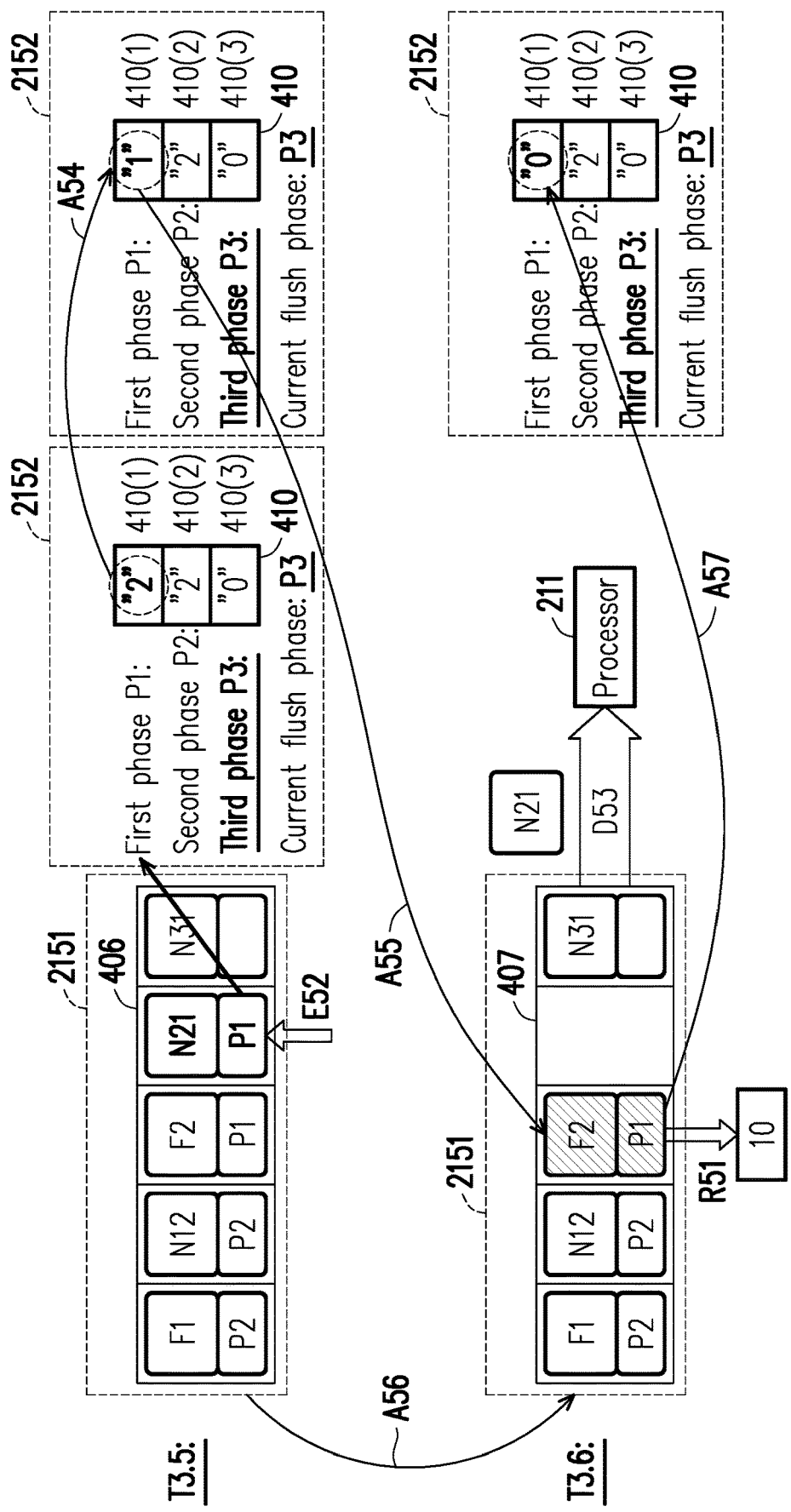

FIG. 5A to FIG. 5C are schematic diagrams for managing a command queue according to another embodiment of the invention.

With reference to FIG. 5A, for instance, at a timepoint 3.1, the command queue management circuit 2151 identifies one or more non-flush commands (i.e., the commands N11, N21 and N12) in the command queue 404. The command queue management circuit 2151 selects one from among the commands N11, N21 and N12 as the target command according to a preset rule. For descriptive convenience, the preset rule is the first-in first-out approach. That is to say, among the commands N11, N21 and N12, the non-flush command first stored in the command queue is selected as the new target command. In the example of FIG. 5A, as shown by an arrow E51, the command N11 is selected as the target command and the command queue management circuit 2151 identifies the flush phase value (a.k.a. a target flush phase value) of the command N11 as "P2". According to the target flush phase value "P2", "3" is being identified by the command queue management circuit 2151 according to the flush phase count 410(2) corresponding to the flush phase "P2" recorded by the flush phase counting circuit 2152 (e.g., the target flush phase count is found to be "3" according to the target flush phase and the flush phase count table).

With reference to FIG. 2C, in step S211, the flush phase counting circuit 2152 subtracts one from the target flush phase count. For example, at a timepoint T3.2, in response to the target command having the target flush phase value, the flush phase counting circuit 2152 subtracts one from the target flush phase count. That is to say, the flush phase count 410(2) corresponding to the flush phase P2 is adjusted from "3" to "2" (as shown by an arrow A51).

After subtracting one from the target flush phase count, the command queue management circuit 2151 determines whether the target flush phase count value is equal to 1. In response to the target flush phase count equal to 1, step S212 is executed; and in response to the target flush phase count not equal to 1, step S207 is executed.

For instance, in the example above, the target flush phase count is "2", which is not equal to 1. Therefore, the process proceeds to step S207, the command queue management circuit 2151 instructs the processor 211 to execute the target command. Then, in response to an execution of the target command being completed, the command queue management circuit 2151 deletes the target command from the command queue. As shown by an arrow D51 of FIG. 5A, the command N11 is transmitted to the processor 211 so the processor 211 can execute the corresponding operation according to the command N11. It should be noted that, the invention is not limited by the details regarding how the processor 211 executes the command. Next, as shown by an arrow A52, the command queue management circuit 2151 deletes the target command N11 and the corresponding target flush phase value "P2" from the command queue 404. At this time, a command queue 405 has one remaining space (because the target command N11 and the corresponding flush phase value "P2" are deleted).

Next, the overall process returns to step S201. With reference to FIG. 5B, for instance, it is assumed that the command buffer 2301 has three host commands N31, F3 and N13. At a timepoint T3.3, as shown by an arrow D52, the command N31 is acquired. At a timepoint T3.4, as shown by an arrow A53, the command N31 is stored into a command queue 406. At this time, since the command queue 406 does not have the remaining space, the process proceeds to step S205 and step S206 again.

For instance, with reference to FIG. 5C, at a timepoint T3.5, as shown by an arrow E52, the command queue management circuit 2151 selects the command N21 as the target command, and reduces the corresponding target flush phase count 410(1) from "2" to "1" (as shown by am arrow A54). At this time, as shown by an arrow A55, in response to the target flush phase count 410(1) equal to 1, step S212 is executed. In step S212, the command queue management circuit 2151 instructs the processor 211 to execute the target command, and deletes the target command in the command queue in response to the execution of the target command being completed. Step S212 is similar to step S207, and thus details regarding the same is not repeated hereinafter (as shown by an arrow D53). For instance, as shown by an arrow A56, at a timepoint T3.6, the command N21 and the corresponding flush phase value "P1" are deleted. However, unlike step S201 subsequent to step S207, the command queue management circuit 2151 proceeds to execute step S213 after step S212 is completed. That is to say, the command queue management circuit 2151 further deletes the target command in the command queue, and responds to the host system that an execution of a target flush command corresponding to the target flush phase value is completed. Because the command to be deleted (e.g., the command N21) as instructed by the flush command F2 has been deleted, as shown by an arrow R51, the command queue management circuit 2151 instructs the processor 211 (or the command queue management circuit 2151 itself) to respond to the host system 10 that the execution of the flush command F2 is completed.

It should be noted that, from the above example, it can be known that, after the flush command F2 is received and before responding that the execution of the flush command F2 is completed in this embodiment, the flush command F2 is not executed directly and, instead, the non-flush command (e.g., the command N11) not corresponding to the flush command F2 would be executed according to the procedures mentioned above. In addition, when the second commands corresponding to the flush command F2 are all executed, the host system 10 can directly receive a response indicating that execution of the flush command F2 is completed. In other words, the host command management operation of the present embodiment does not cause an execution order of the other non-flush commands (which is arranged before the newly received flush command) not corresponding to the newly received flush command to be taken over by the newly received flush command, thereby preventing the resource fight caused by the newly received flush command.

Next, the process proceeds to step S214, in which the flush phase counting circuit 2152 sets the target flush phase count as the preset value. For instance, as shown by an arrow A57, after responding that the execution of the flush command F2 corresponding to the target flush phase value "P1" is completed, the target flush phase value 410(1) is set as the preset value (e.g., "0"). Next, the overall process returns to step S201.

It is worth noting that, in response to both the command buffer 2301 and the command queue not having any of the commands, the host command management circuit unit 215 ends all the steps in the memory management method. In addition, in response to one of the commands being received from the host system 10 via the empty command buffer 2301, the process 211 can instruct the host command management circuit unit 215 to start executing step S201. Here, during the process of executing step S201, if the command buffer 2301 does not include the new first command being acquirable (e.g., the command buffer 2301 is empty), step S206 is executed.

In summary, when the flush command is received by the command queue, instead of executing and clearing the non-flush commands corresponding to the flush command in the command queue directly according to the received flush command, the memory management method and the memory controller provided by this embodiment of the invention can record the corresponding flush phase values to the flush command and the commands corresponding to the flush command in the command queue according to the current flush phase, record the corresponding flush phase counts and update the current flush phase. In addition, the recorded flush phase count may be further adjusted according to different conditions to manage commands corresponding to different flush phases in the command queue, thereby completing the received flush command. In other words, the memory management method and the storage controller provided by this embodiment can prevent the non-flush commands corresponding to the flush command in the command queue from having special priority (prevent the resource fight caused by the flush command), so as to avoid delaying the execution of the other commands. In this way, the storage device can complete the received flush command while smoothly digesting (executing) all the commands in the command queue, thereby improving data access efficiency and work efficiency of the storage device. Moreover, the use of the flush phase count can allow the storage controller to manage the commands corresponding to the different flush phases currently in the command queue more efficiently.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A memory management method, adapted for a storage device having a rewritable non-volatile memory module, the method comprising the following steps:
   (1) acquiring a new first command from a command buffer, and determining whether the first command is a flush command, wherein step (2a) is executed in response to determining that the first command is the flush command, wherein step (2b) is executed in response to determining that the first command is not the flush command;
   (2a) storing the flush command into a command queue, identifying one or more second commands corresponding to the flush command in the command queue according to the flush command, and counting a sum of the flush command and said one or more second commands as a flush phase count corresponding to a current flush phase;
   setting a flush phase value of each of the flush command and said one or more second commands in the command queue according to the current flush phase, and adjusting the current flush phase from a first flush phase among a plurality of flush phases to a second flush phase; and
   executing step (1) or step (3) according to a total of one or more flush commands in the command queue and a remaining space of the command queue;
   (2b) storing the first command into the command queue, and executing step (1) or step (3) according to the remaining space of the command queue;
   (3) stop acquiring a new first command from the command buffer, and executing step (4);
   (4) selecting a new target command from one or more non-flush commands in the command queue, and identifying a target flush phase value of the target command and a target flush phase count corresponding to the target flush phase value, wherein step (5a) is executed in response to the target command not having the target flush phase value, wherein step (5b) is executed in response to the target command having the target flush phase value;
   (5a) executing the target command, deleting the target command from the command queue in response to an execution of the target command being completed, and executing step (1);
   (5b) changing the target flush phase count, and executing step (5a) or step (5c) according to the changed target flush phase count;
   (5c) executing the target command, responding to a host system that an execution of a target flush command corresponding to the target flush phase count is completed, setting the target flush phase count as the preset value, and executing step (1).

2. The memory management method according to claim 1, wherein the command buffer is configured to receive commands from the host system, wherein the method further comprises the following steps:
   ending all the steps in the memory management method in response to both the command buffer and the command queue not having any of the commands; and
   executing step (1) in response to one command being received from the host system via the empty command buffer,
   wherein the step of acquiring the new first command from the command buffer in step (1) comprises executing step (4) in response to the command buffer not having the new first command being acquirable.

3. The memory management method according to claim 1, wherein the command queue is maintained in a host command management circuit unit, and all commands in the command queue are respectively marked with the corresponding flush phase value, wherein a flush phase count table is maintained in the host command management circuit unit, and the flush phase count table is recorded with the plurality of flush phases and a plurality of flush phase counts corresponding to the flush phases, wherein step (4) comprises:

selecting the target command from said one or more non-flush commands in the command queue according to a first in first out approach; and identifying the marked target flush phase value of the target command from the command queue, and finding the corresponding flush phase count from the flush phase count table according to the target flush phase value.

4. The memory management method according to claim 1, wherein step (5b) comprises:

changing the target flush phase count by subtracting one from the target flush phase count in response to the target command having the target flush phase value;

determining whether the changed target flush phase count is equal to 1, wherein step (5a) is executed in response to the target flush phase count not equal to 1, wherein step (5c) is executed in response to the target flush phase count equal to 1, wherein step (5c) comprises:

deleting the target command and the target flush command in response to the execution of the target command being completed.

5. The memory management method according to claim 1, wherein the flush command is configured to delete said one or more second commands in the command queue, and both the flush command and said one or more second commands correspond to the same identification unit, wherein step (2a) comprises:

not executing said one or more second command according to the flush command, and not deleting said one or more second commands;

recording the flush phase count to correspond to the first flush phase among the flush phases, wherein the flush phases are arranged in a round robin manner, and the second flush phase is arranged after the first flush phase.

6. The memory management method according to claim 5, wherein the step of executing step (1) or step (3) according to the total of said one or more flush commands in the command queue and the remaining space of the command queue in step (2a) comprises:

determining whether the total of said one or more flush commands in the command queue is greater than a phase upper limit, wherein step (3) is executed in response to determining that the total of said one or more flush commands is greater than the phase upper limit, wherein whether the command queue has the remaining space is determined in response to determining that the total of said one or more flush commands is not greater than the phase upper limit, wherein step (3) is executed in response to determining that the command queue does not have the remaining space, wherein step (1) is executed in response to determining that the command queue has the remaining space.

7. A storage controller for controlling a storage device having a rewritable non-volatile memory module, the storage controller comprising:

a connection interface circuit, configured to couple to a host system, wherein the connection interface circuit comprises a command buffer, configured to temporarily store commands from the host system;

a memory interface control circuit, configured to couple to the rewritable non-volatile memory module;

a host command management circuit unit; and a processor, coupled to the connection interface circuit, the memory interface control circuit and the host command management circuit unit, wherein the processor is configured to instruct the host command management circuit unit to execute a host command management operation, and the host command management operation comprises the following steps:

(1) acquiring a new first command from a command buffer and determine whether the first command is a flush command by the host command management circuit unit, wherein step (2a) is executed in response to determining that the first command is the flush command, wherein step (2b) is executed in response to determining that the first command is not the flush command;

(2a) storing the flush command into the command queue, identifying one or more second commands corresponding to the flush command in the command queue according to the flush command and counting a sum of the flush command and said one or more second commands as a flush phase count corresponding to a current flush phase by the host command management circuit unit;

setting a flush phase value of each of the flush command and said one or more second commands in the command queue according to the current flush phase and adjusting the current flush phase from a first flush phase among a plurality of flush phases to a second flush phase by the host command management circuit unit; and executing step (1) or step (3) according to a total of one or more flush commands in the command queue and a remaining space of the command queue by the host command management circuit unit;

(2b) storing the first command into the command queue and executing step (1) or step (3) according to the remaining space of the command queue by the host command management circuit unit;

(3) stop acquiring a new first command from the command buffer and executing step (4) by the host command management circuit unit;

(4) selecting a new target command from one or more non-flush commands in the command queue and identifying a target flush phase value of the target command and a target flush phase count corresponding to the target flush phase value by the host command management circuit unit, wherein step (5a) is executed in response to the target command not having the target flush phase value, wherein step (5b) is executed in response to the target command having the target flush phase value;

(5a) instructing the processor to execute the target command by the host command management circuit unit, and deleting the target command from the command queue in response to an execution of the target command being completed and executing step (1) by the host command management circuit unit;

(5b) changing the target flush phase count and executing step (5a) or step (5c) according to the changed target flush phase count by the host command management circuit unit;

(5c) instructing the processor to execute the target command and respond to the host system that an execution of a target flush command corresponding to the target flush phase count is completed by the host command management circuit unit, and setting the target flush phase count as the preset value and executing step (1) by the host command management circuit unit.

8. The storage controller according to claim 7, wherein the command buffer is configured to receive commands from the host system, wherein the method further comprises the following steps:

ending all the steps in the memory management method in response to both the command buffer and the command queue not having any of the commands by the host command management circuit unit; and executing step (1) in response to one command being received from the host system via the empty command buffer by the host command management circuit unit, wherein the step of acquiring the new first command from the command buffer in step (1) comprises executing step (4) in response to the command buffer not having the new first command being acquirable.

9. The storage controller according to claim 7, wherein the command queue is maintained in the host command management circuit unit, and all commands in the command queue are respectively marked with the corresponding flush phase value, wherein a flush phase count table is maintained in the host command management circuit unit, and the flush phase count table is recorded with the flush phases and a plurality of flush phase counts corresponding to the flush phases, wherein step (4) comprises:

selecting the target command from said one or more non-flush commands in the command queue according to a first in first out approach by the host command management circuit unit; and identifying the marked target flush phase value of the target command from the command queue and finding the corresponding flush phase count from the flush phase count table according to the target flush phase value by the host command management circuit unit.

10. The storage controller according to claim 7, wherein step (5b) comprises:

changing the target flush phase count by subtracting one from the target flush phase count in response to the target command having the target flush phase value by the host command management circuit unit;

determining whether the changed target flush phase count is equal to 1 by the host command management circuit unit, wherein step (5a) is executed in response to the target flush phase count not equal to 1, wherein step (5c) is executed in response to the target flush phase count equal to 1, wherein step (5c) comprises:

deleting the target command and the target flush command in response to the execution of the target command being completed by the host command management circuit unit.

11. The storage controller according to claim 7, wherein the flush command is configured to delete said one or more second commands in the command queue, and both the flush command and said one or more second commands correspond to the same identification unit, wherein step (2a) comprises:

not executing said one or more second command according to the flush command and not deleting said one or more second commands by the host command management circuit unit;

recording the flush phase count to correspond to the first flush phase among the flush phases by the host command management circuit unit, wherein the flush phases are arranged in a round robin manner, and the second flush phase is arranged after the first flush phase.

12. The storage controller according to claim 11, wherein the step of executing step (1) or step (3) according to the total of said one or more flush commands in the command queue and the remaining space of the command queue in step (2a) comprises:

determining whether the total of said one or more flush commands in the command queue is greater than a phase upper limit by the host command management circuit unit, wherein step (3) is executed in response to determining that the total of said one or more flush commands is greater than the phase upper limit, wherein the host command management circuit unit determines whether the command queue has the remaining space in response to determining that the total of said one or more flush commands not is greater than the phase upper limit, wherein step (3) is executed in response to determining that the command queue does not have the remaining space, wherein step (1) is executed in response to determining that the command queue has the remaining space.

\* \* \* \* \*